（12）United States Patent
Okumura et al.

(10) Patent No.: US 12,472,638 B2
(45) Date of Patent: Nov. 18, 2025

(54) INFORMATION PROCESSING DEVICE, ROBOT, AND MOBILE TERMINAL DEVICE

(71) Applicants: Sony Interactive Entertainment Inc., Tokyo (JP); Sony Group Corporation, Tokyo (JP); Sony Interactive Entertainment LLC, San Mateo, CA (US)

(72) Inventors: Yasushi Okumura, Tokyo (JP); Kotaro Imamura, Chiba (JP); Udupi Ramanath Bhat, Los Altos, CA (US); Daisuke Kawamura, Foster City, CA (US); Naoki Ogishita, San Mateo, CA (US); Tsuyoshi Fukuyama, Tokyo (JP); Ryuichi Suzuki, Tokyo (JP); Karen Murata, Tokyo (JP); Mari Yasuda, Tokyo (JP)

(73) Assignees: Sony Interactive Entertainment Inc., Tokyo (JP); Sony Group Corporation, Tokyo (JP); Sony Interactive Entertainment LLC, San Mateo, CA (US)

( * ) Notice: Subject to any disclaimer, the term of this patent is extended or adjusted under 35 U.S.C. 154(b) by 107 days.

(21) Appl. No.: 18/350,124

(22) Filed: Jul. 11, 2023

(65) Prior Publication Data
US 2024/0017418 A1 Jan. 18, 2024

Related U.S. Application Data

(60) Provisional application No. 63/389,376, filed on Jul. 15, 2022.

(51) Int. Cl.
B25J 11/00 (2006.01)
B25J 9/16 (2006.01)
B25J 19/02 (2006.01)

(52) U.S. Cl.
CPC ......... *B25J 11/0015* (2013.01); *B25J 9/1689* (2013.01); *B25J 19/023* (2013.01)

(58) Field of Classification Search
CPC .... B25J 11/0015; B25J 9/1689; B25J 19/023; B25J 11/00; B25J 13/00; H04N 7/142; H04N 7/15
(Continued)

(56) References Cited

U.S. PATENT DOCUMENTS 6,914,622 B1 * 7/2005 Smith ............... H04N 7/15
348/E7.083
9,794,516 B1 * 10/2017 Tuli ............ H04N 21/42204
(Continued)

FOREIGN PATENT DOCUMENTS

JP 2017216643 A 12/2017

Primary Examiner — Kira Nguyen
(74) Attorney, Agent, or Firm — Kilpatrick Townsend & Stockton LLP

(57) ABSTRACT

Provided is an information processing device that controls a motion of a robot having a torso and a head. The information processing device includes an acquisition section that acquires an image of a face of a user that is captured by a camera of a mobile terminal device, a motion detection section that detects an orientation of the face of the user from the acquired image, a control signal generation section that generates a control signal for rotating the first or the second rotating device of the robot according to the detected orientation of the face of the user, and a transmission section that transmits the generated control signal to the robot.

20 Claims, 8 Drawing Sheets

(58) Field of Classification Search
USPC .......................................................... 700/245
See application file for complete search history.

(56) References Cited

U.S. PATENT DOCUMENTS

| | | | |
|---|---|---|---|
| 11,297,281 B1* | 4/2022 | Agrawal | G10L 17/22 |
| 2019/0118386 A1* | 4/2019 | Okumura | B25J 13/088 |
| 2022/0152836 A1* | 5/2022 | Ueyama | B25J 9/1697 |
| 2022/0301130 A1* | 9/2022 | Kida | G06V 10/806 |

* cited by examiner

INFORMATION PROCESSING DEVICE, ROBOT, AND MOBILE TERMINAL DEVICE

BACKGROUND

The present disclosure relates to a telexistence technology that allows a user to view a video viewed from a viewpoint of a robot present at a remote location.

In recent years, a technology called "telexistence" has been developed to utilize a remotely located robot as an avatar of the user. The technology enables the remotely located robot to transmit image data and sound data of surroundings of the robot to the user, and allows the user to reproduce the transmitted image data and sound data, feel as if the user is present at a location where the robot is located, and communicate with people around the robot.

Disclosed in Japanese Patent Laid-Open No. 2017-216643 is an information processing system that determines a line of sight of a camera of a robot disposed at a remote location according to a posture of a head-mounted display worn on a head of a user. The robot described in Japanese Patent Laid-Open No. 2017-216643 includes an actuator device having a three-axis rotation mechanism and changes a position and a posture of a housing in which the camera is disposed.

SUMMARY

The information processing system disclosed in Japanese Patent Laid-Open No. 2017-216643 is designed on an assumption that the head-mounted display is used. Therefore, the information processing system disclosed in Japanese Patent Laid-Open No. 2017-216643 may not be used in an environment where no head-mounted display exists. Consequently, it is demanded that a device for conveniently utilizing the telexistence technology through the use of a smartphone or other mobile terminal devices be created.

In view of the above circumstances, the present disclosure has been made to provide a technology that makes it easy to use the telexistence technology.

Means for Solving the Problem

According to an aspect of the present disclosure, there is provided an information processing device that controls a motion of a robot having a torso and a head. The robot includes a first rotating device and a second rotating device. The first rotating device rotates the head with respect to the torso. The second rotating device rotates the torso with respect to a contact surface of the robot. The information processing device includes an acquisition section, a motion detection section, a control signal generation section, and a transmission section. The acquisition section acquires an image of a face of a user that is captured by a camera of a mobile terminal device. The motion detection section detects an orientation of the face of the user from the acquired image. The control signal generation section generates a control signal for rotating the first rotating device or the second rotating device of the robot according to the detected orientation of the face of the user. The transmission section transmits the generated control signal to the robot.

According to another aspect of the present disclosure, there is provided a robot having a torso and a head. The robot includes a first rotating device, a second rotation device, and a control section. The first rotating device rotates the head with respect to the torso. The second rotating device rotates the torso with respect to a contact surface of the robot. The control section drives the first rotating device and the second rotating device. After driving the first rotating device to rotate the head, the control section drives the second rotating device to rotate the torso.

According to still another aspect of the present disclosure, there is provided a mobile terminal device including a camera, an inertial measurement unit, a transmission section, a reception section, and a display section. The camera captures an image of a face of a user. The transmission section transmits image data captured by the camera and sensor data measured by the inertial measurement unit to an information processing device. The reception section receives an image captured by a robot. The display section displays the image captured by the robot.

Any combinations of the above-mentioned component elements and any conversions of expressions of the present disclosure between, for example, methods, devices, systems, recording media, and computer programs are also effective as the aspects of the present disclosure.

DETAILED DESCRIPTION OF THE PREFERRED EMBODIMENT

Figure 1:
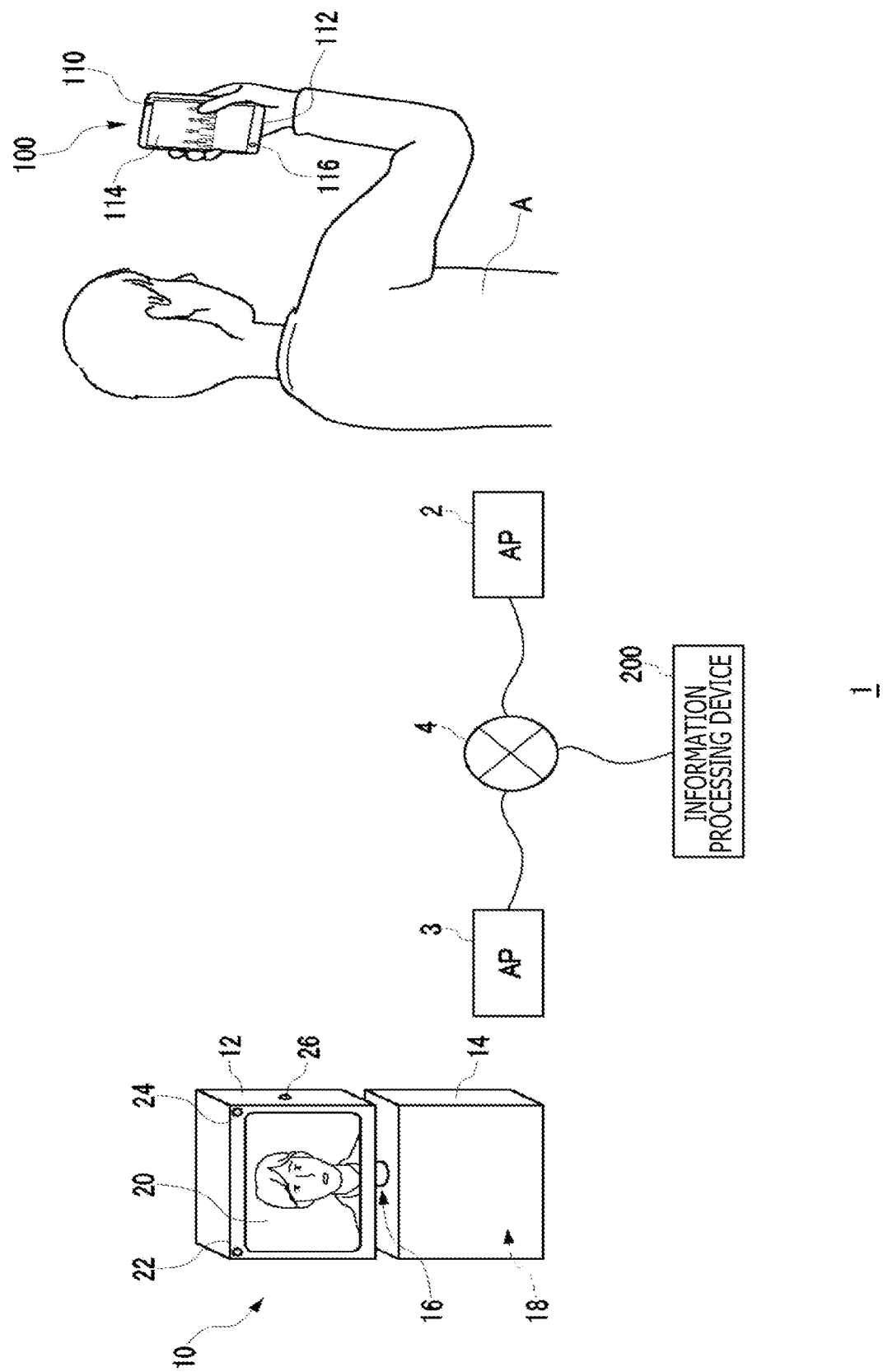
FIG. 1 is a diagram presenting an overview of an information processing system according to an embodiment of the present disclosure.

FIG. 1 is a diagram presenting an overview of an information processing system 1 according to an embodiment of the present disclosure. The information processing system 1 includes a mobile terminal device 100, a robot 10, and an information processing device 200. The mobile terminal device 100 is to be operated by a user A. The robot 10 is disposed at a location remote from the user A. The mobile terminal device 100 is connected to an access point (AP) 2 in accordance with a known wireless communication protocol, and is connected to a network 4, such as the Internet, through the AP 2. Similarly, the robot 10 is connected to an AP 3 in accordance with a known wireless communication protocol, and is connected to the network 4 through the AP 3. The robot 10 is connected to the AP 3 in accordance with a known wireless communication protocol. Alternatively, however, the robot 10 may be connected to the AP 3 by using a cable. The mobile terminal device 100 and the robot 10 may be communicatively connected through the information processing device 200.

The robot 10 includes a head 12 and a torso 14. The head 12 is disposed above the torso 14. In the embodiment, a housing of the head 12 and a housing of the torso 14 are both shaped like a cuboid. The head 12 and the torso 14 are coupled together by a first rotating device 16. Note that, the first rotating device 16 has a mechanism for rotating the head 12 with respect to the torso 14. The first rotating device 16 may directly couple the head 12 and the torso 14. Alternatively, however, a separate part may be disposed between the head 12 and the torso 14. The first rotating device 16 used in the embodiment includes a three-axis rotation mechanism for rotating the head 12 in a roll direction, in a pitch direction, and in a yaw direction. The first rotating device 16 may be the three-axis rotation mechanism disclosed in Japanese Patent Laid-Open No. 2017-216643. Alternatively, however, the first rotating device 16 may be a different mechanism.

A second rotating device 18 is disposed on a bottom of the housing of the torso 14 in order to rotate the torso 14 with respect to a contact surface of the robot 10. The second rotating device 18 may be a moving mechanism for moving the robot 10 with respect to the contact surface, and may form a leg of the robot 10. The moving mechanism includes three or more omni wheels that are disposed below the bottom of the housing of the torso 14 and able to move the robot 10 in all directions. By making a rotary motion in the yaw direction at a certain location, the moving mechanism functions as the second rotating device 18 that rotates the torso 14 in the yaw direction with respect to the contact surface. The description of the embodiment does not deal with front-rear motion and left-right motion that are caused by the moving mechanism, but is focused on the function of the moving mechanism that causes the torso 14 to make a rotary motion in the yaw direction.

The head 12 includes a display section 20. The display section 20, which is disposed on the front of the housing of the head 12, displays a face image of the user A holding the mobile terminal device 100 or an image related to the user A (e.g., an avatar image of the user A). Further, the head 12 includes a camera 22, a speaker 24, and a microphone 26. The camera 22 captures an image of the surroundings of the robot 10. The speaker 24 outputs a sound. The microphone 26 collects the sounds of the surroundings of the robot 10. The camera 22, which is disposed on the front of the housing of the head 12, captures an image of a space including the direction in which the display section 20 faces. The microphone 26 may be disposed on both sides of the housing.

The information processing device 200 according to the embodiment may be a server device that provides real-time communication services. By using the real-time communication services, the user A staying at home is able to converse with members present in a conference room through the robot 10 disposed in the conference room.

In the information processing system 1 that implements telexistence, the robot 10 operates as a generally-called avatar of the user A. Upon acquiring information indicative of the orientation of the face of the user A from the mobile terminal device 100, the information processing device 200 generates a control signal for controlling the motion of the head 12 of the robot 10 and supplies the generated control signal to the robot 10. Then, the robot 10 drives the first rotating device 16 and/or the second rotating device 18 according to the control signal. For example, when the user A shakes his/her head vertically (in the pitch direction), the first rotating device 16 moves shakes the head 12 vertically. Further, when the user A turns his/her head sideways (in the yaw direction), the first rotating device 16 or the second rotating device 18 turns the head 12 sideways. This makes the people around the robot 10 feel as if the user A is there, and enables the people to communicate with the user A.

Moreover, the user A is able to change the video viewed from the viewpoint of the robot 10 by moving the head 12 of the robot 10.

Figure 2:
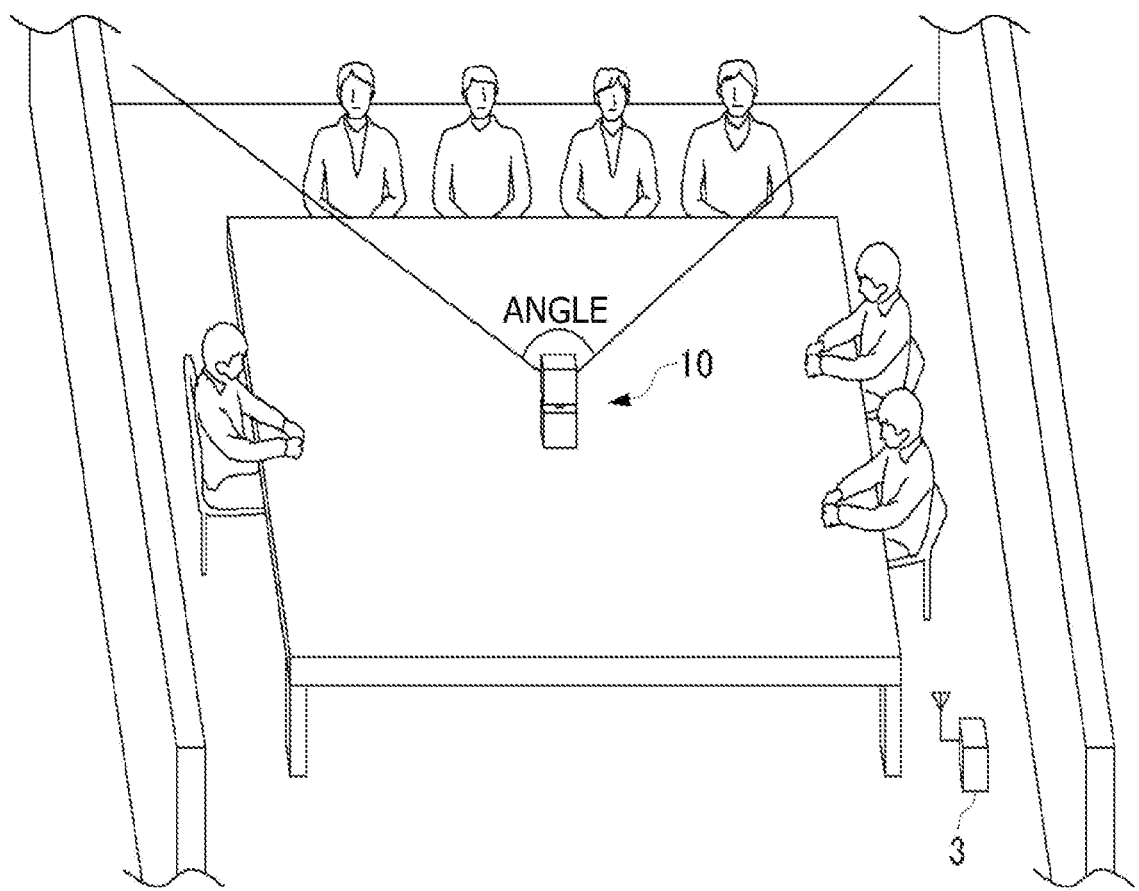
FIG. 2 is a diagram illustrating an example scene where a robot is utilized.

FIG. 2 illustrates an example scene where the robot 10 is utilized. FIG. 2, which depicts the inside of a conference room, indicates that a plurality of members are seated around a table while the robot 10, which is the avatar of the user A, is placed at the center of the table. In the example of FIG. 2, the front of the head 12, on which the camera 22 is mounted, faces four members, and the camera 22 captures an image of the four members within the angle of view of the camera 22. In this instance, the four members are able to view the face image or the avatar image of the user A that is displayed on the display section 20. The robot 10 transmits the image captured by the camera 22 and the sounds collected by the microphone 26 to the user's mobile terminal device 100 in real time.

The mobile terminal device 100 is a smartphone, a tablet, or other terminal devices that can be held and operated by a hand of the user A. The mobile terminal device 100 includes a camera 110, a microphone 112, a display section 114, and a speaker 116. The camera 110 captures an image of the user A. The microphone 112 collects sounds generated by the user. The display section 114 displays an image captured by the robot 10. The speaker 116 outputs sounds acquired by the robot 10. The camera 110 is positioned so as to be able to capture an image of the user A viewing the image displayed on the display section 114.

The user is able to participate in a conference while listening to the sounds outputted from the speaker 116 and viewing the inside of the conference room displayed on the display section 114. The display section 114 displays the image captured by the camera 22 of the robot 10. In a situation depicted in FIG. 2, the four members in the conference room are displayed on the display section 114. When the user A speaks, the mobile terminal device 100 transmits the sounds collected by the microphone 112 to the robot in real time, and allows the robot 10 to output the sounds generated by the user A from the speaker 24.

Figure 3:
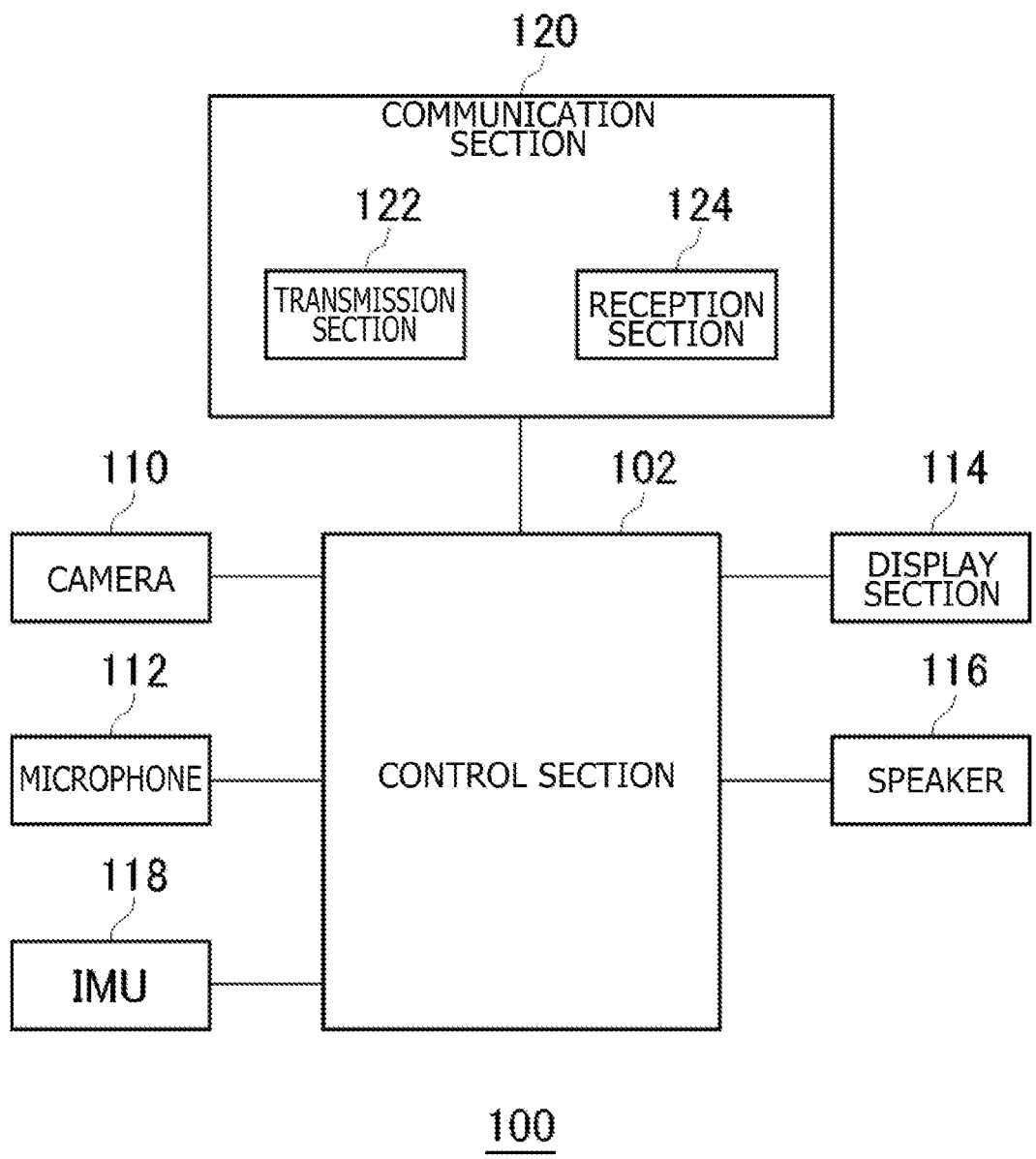
FIG. 3 is a diagram illustrating functional blocks of a mobile terminal device.

FIG. 3 illustrates the functional blocks of the mobile terminal device 100. The mobile terminal device 100 includes a control section 102, the camera 110, the microphone 112, the display section 114, the speaker 116, an inertial measurement unit (hereinafter referred to as the "IMU") 118, and a communication section 120. The control section 102 is a main processor that processes and outputs commands and various data, such as image data, sound data, and sensor data. In the information processing system 1 according to the embodiment, the user A holds the mobile terminal device 100 in hand with the camera 110 and the display section 114 facing the user A, and allows the camera 110 to capture an image of the face of the user A.

The camera 110 captures an image at predetermined intervals (e.g., at 1/60 second intervals) and supplies captured image data to the control section 102. The microphone 112 generates a sound signal by converting the sounds around the mobile terminal device 100 to an electrical signal, and allows the control section 102 to generate sound data by encoding the sound signal. The IMU 118, which is a posture sensor including a three-axis acceleration sensor and a three-axis gyro sensor, periodically measures the acceleration of each axis and the angular velocity around each axis, and supplies sensor data, which includes the measured acceleration value and angular velocity value, to the control section 102.

The communication section 120, which includes a transmission section 122 and a reception section 124, connects with the AP 2 through an antenna, and transmits and receives data to and from the information processing device 200. The transmission section 122 receives image data, sound data, and sensor data from the control section 102, and transmits the received data to the information processing device 200. The reception section 124 receives, from the information processing device 200, the image data captured by the robot 10 and the sound data acquired by the robot 10, and supplies the received data to the control section 102. The control section 102 causes the display section 114 to display the image data captured by the robot 10, and causes the speaker 116 to output the sound data acquired by the robot 10. The display section 114 may be a display device such as a liquid-crystal display or an organic electroluminescence (EL) display.

Figure 4:
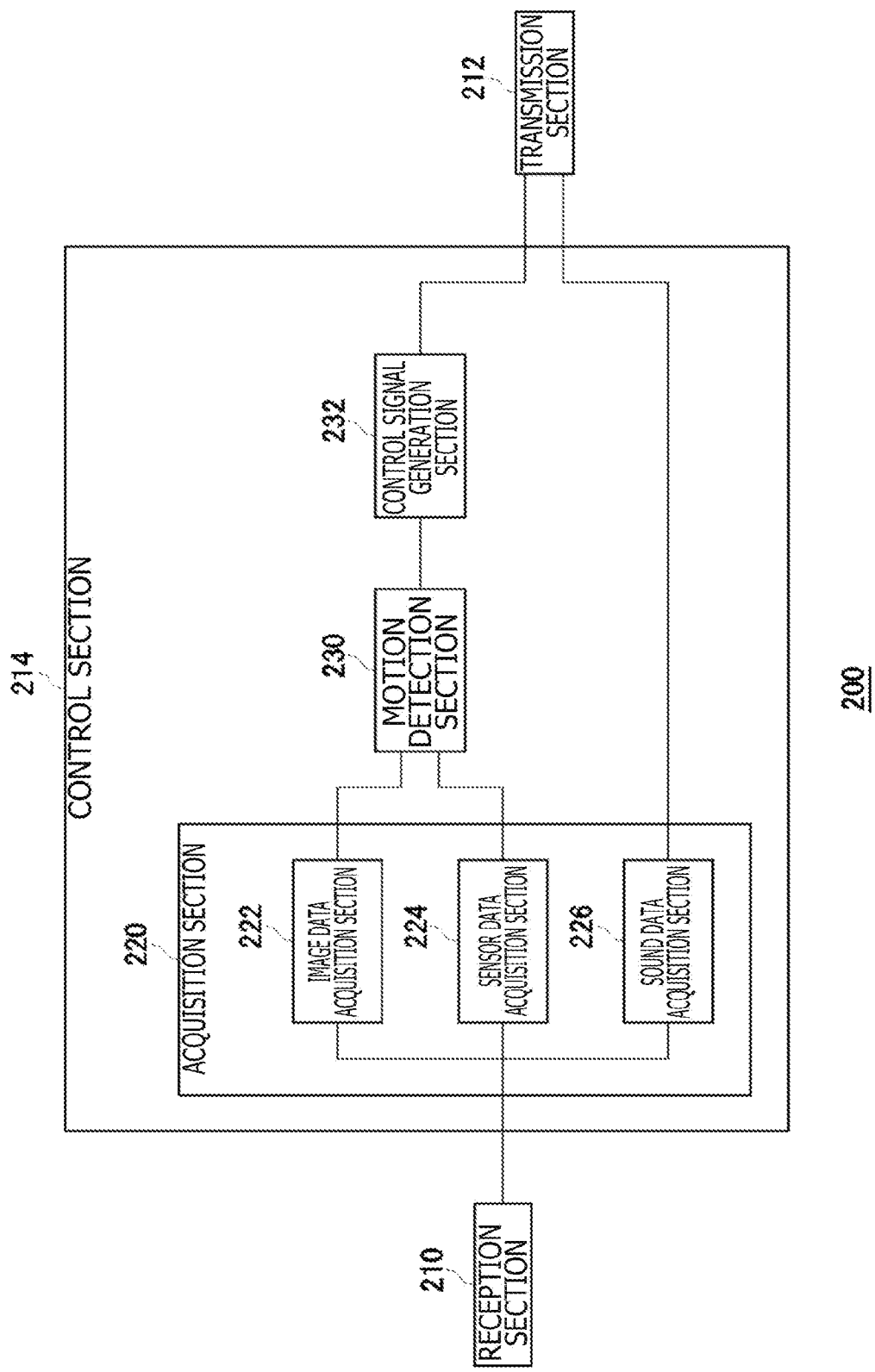
FIG. 4 is a diagram illustrating the functional blocks of an information processing device.

FIG. 4 illustrates the functional blocks of the information processing device 200. The information processing device 200 includes a reception section 210, a transmission section 212, and a control section 214. The control section 214 includes an acquisition section 220, a motion detection section 230, and a control signal generation section 232. The acquisition section 220 includes an image data acquisition section 222, a sensor data acquisition section 224, and a sound data acquisition section 226.

The information processing device 200 includes a computer. Various functions depicted in FIG. 4 are implemented when the computer executes a program. The computer includes, as hardware, for example, a memory into which the program is loaded, at least one processor configured to execute the loaded program, an auxiliary storage device, and other LSI. The processor may be formed by a plurality of electronic circuits including a semiconductor integrated circuit and LSI, and the electronic circuits may be mounted on a single chip or mounted on a plurality of chips. The functional blocks depicted in FIG. 4 are implemented through coordination between hardware and software. Thus, it will be understood by persons skilled in the art that the functional blocks may be variously implemented by hardware only, by software only, or by a combination of hardware and software.

As described above, the mobile terminal device 100 transmits, to the information processing device 200, the image data obtained by capturing an image of the face of the user A, the sound data including the sounds generated by the user A, and the sensor data measured by the IMU 118. In the information processing device 200, the reception section 210 receives the image data, the sound data, and the sensor data. The image data acquisition section 222 acquires the image data, the sensor data acquisition section 224 acquires the sensor data, and the sound data acquisition section 226 acquires the sound data. The transmission section 212 transmits the sound data acquired by the sound data acquisition section 226 to the robot 10.

The motion detection section 230 detects the orientation of the face of the user A holding the mobile terminal device 100 in hand. The motion detection section 230 identifies the face image of the user A from the image data acquired by the image data acquisition section 222, and detects the orientation of the face from the identified face image. More specifically, when detecting the orientation of the face, the motion detection section 230 detects a roll angle, a pitch angle, and a yaw angle of the face. The roll angle is a head tilt angle. The pitch angle is a head nodding angle. The yaw angle is a head swing angle. The motion detection section 230 may detect the orientation of the face by using a known method. For example, the motion detection section 230 may detect the roll angle, the pitch angle, and the yaw angle of the face by using a positional relation between a plurality of parts of the face image and a plurality of parts of a face model image. As a matter of course, the motion detection section 230 may detect the roll angle, the pitch angle, and the yaw angle of the face by using a different method.

The control signal generation section 232 determines the roll direction rotation angle, the pitch direction rotation angle, and the yaw direction rotation angle of the head 12 of the robot 10 according to the detected orientation of the face, and generates a control signal for rotating the first rotating device 16 and/or the second rotating device 18. Note that, in the embodiment, the second rotating device 18 handles only the yaw direction rotation and does not handle the roll direction rotation and the pitch direction rotation. The transmission section 212 transmits the control signal, which is generated by the control signal generation section 232, to the robot 10.

Since the robot 10 is disposed in the conference room as the avatar of the user A, it is desirable that the robot 10 move in a similar manner to humans. For example, an unlimited lateral rotation (yaw direction rotation) of the head 12 with respect to the torso 14 is not desirable as the motion of the avatar because it surpasses the motion capability of humans and causes a sense of discomfort. Therefore, the first rotating device 16 is configured so as to set a maximum rotation angle for each of the roll direction, the pitch direction, and the yaw direction rotation angles. The maximum rotation angle is an angular limit beyond which rotation is not possible.

The maximum rotation angle may be designed as a machine structural angular limit. Alternatively, however, the maximum rotation angle may be set in a software-based manner. It is desirable that the roll direction maximum rotation angle $\alpha$, the pitch direction maximum rotation angle $\beta$, and the yaw direction maximum rotation angle $\gamma$ be set based on the rotation angle limit value of the head in a human skeleton structure. In the embodiment, the absolute value of the roll direction maximum rotation angle $\alpha$, the absolute value of the pitch direction maximum rotation angle $\beta$, and the absolute value of the yaw direction maximum rotation angle $\gamma$ are set to 15 degrees, 15 degrees, and 45 degrees, respectively. As for the pitch direction maximum rotation angle $\beta$, different angles may be set for the downward direction and the upward direction.

The control signal generation section 232 determines the rotation angle of each direction within the range of each maximum rotation angle. When, for example, a roll angle of −10 degrees, a pitch angle of 20 degrees, and a yaw angle of 40 degrees are detected as the orientation of the face by the motion detection section 230, the control signal generation section 232 determines that the first rotating device 16 provides the following rotation angles.

<Rotation Angles Provided by First Rotating Device 16>
Roll direction rotation angle: −10 degrees
Pitch direction rotation angle: 15 degrees
Yaw direction rotation angle: 40 degrees As described above, the control signal generation section 232 determines the rotation angle of each direction within the range of each maximum rotation angle. In the above example, the detected pitch angle of the face is 20 degrees. However, since the pitch direction maximum rotation angle R is 15 degrees, the control signal generation section 232 determines that the pitch direction rotation angle is 15 degrees. The control signal generation section 232 generates a control signal for causing the first rotating device 16 to provide a roll direction rotation angle of −10 degrees, a pitch direction rotation angle of 15 degrees, and a yaw direction rotation angle of 40 degrees, and allows the transmission section 212 to transmit the generated control signal to the robot 10.

Figure 5:
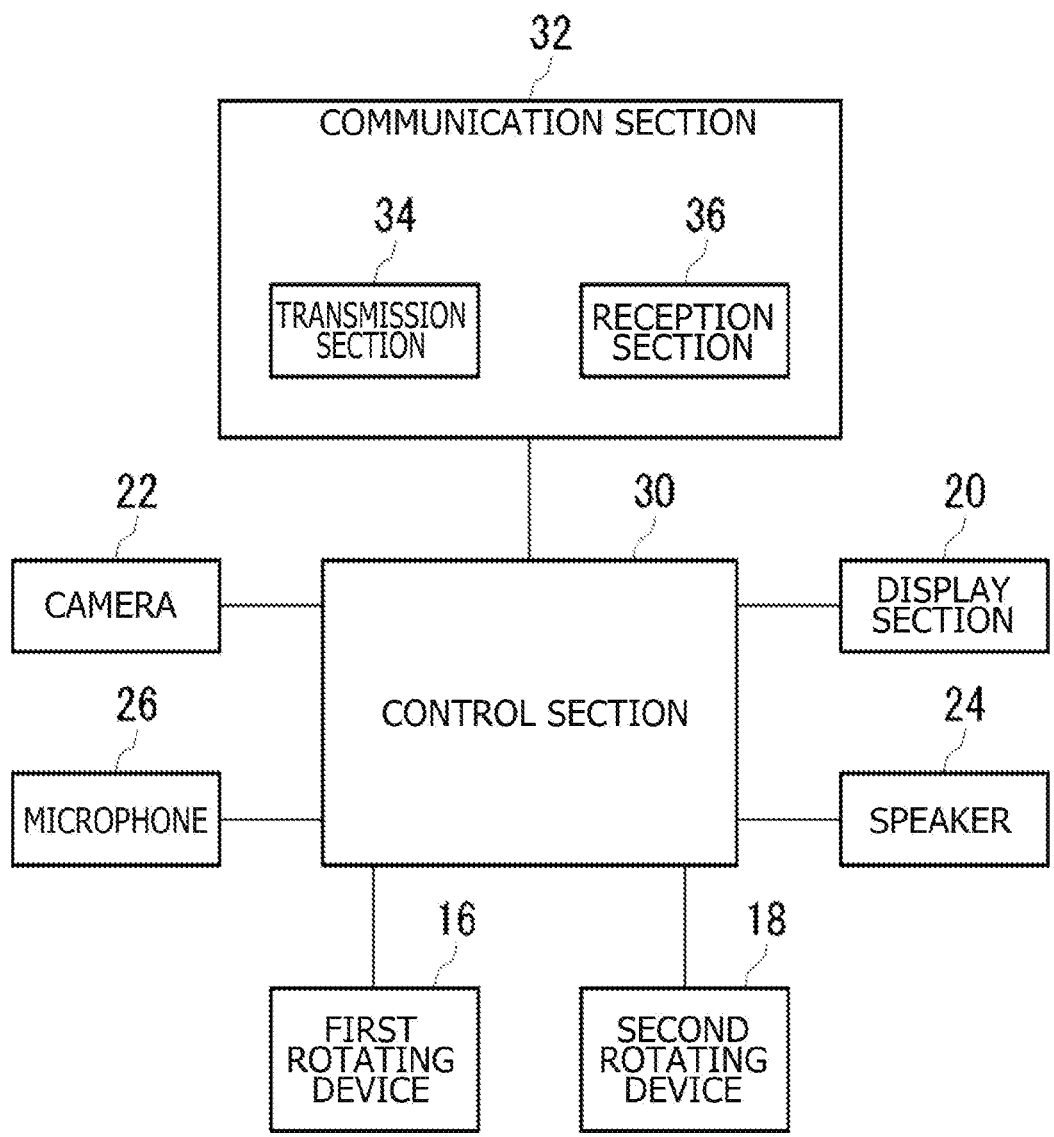
FIG. 5 is a diagram illustrating the functional blocks of the robot.

FIG. 5 illustrates the functional blocks of the robot 10. The robot 10 includes a control section 30, the camera 22, the microphone 26, the display section 20, the speaker 24, the first rotating device 16, the second rotating device 18, and a communication section 32. The control section 30 is a main processor that processes and outputs commands and various data and signals, such as image data, sound data, and a control signal.

The communication section 32 includes a transmission section 34 and a reception section 36, connects with the AP 3 through an antenna, and transmits and receives data or signals to and from the information processing device 200. The reception section 36 receives, from the information processing device 200, the sound data acquired by the mobile terminal device 100 and the control signal for rotating the first rotating device 16 and/or the second rotating device 18, and supplies the received sound data and control signal to the control section 30. The control section 30 causes the speaker 24 to output the sound data acquired by the mobile terminal device 100. Further, the control section 30 displays the face image of the user A on the display section 20. The image to be displayed on the display section 20 may be a still face image of the user A that is transmitted from the mobile terminal device 100 before the start of real-time communication or an avatar image of the user A. The display section 20 may be a display device such as a liquid-crystal display or an organic EL display.

Figure 6:
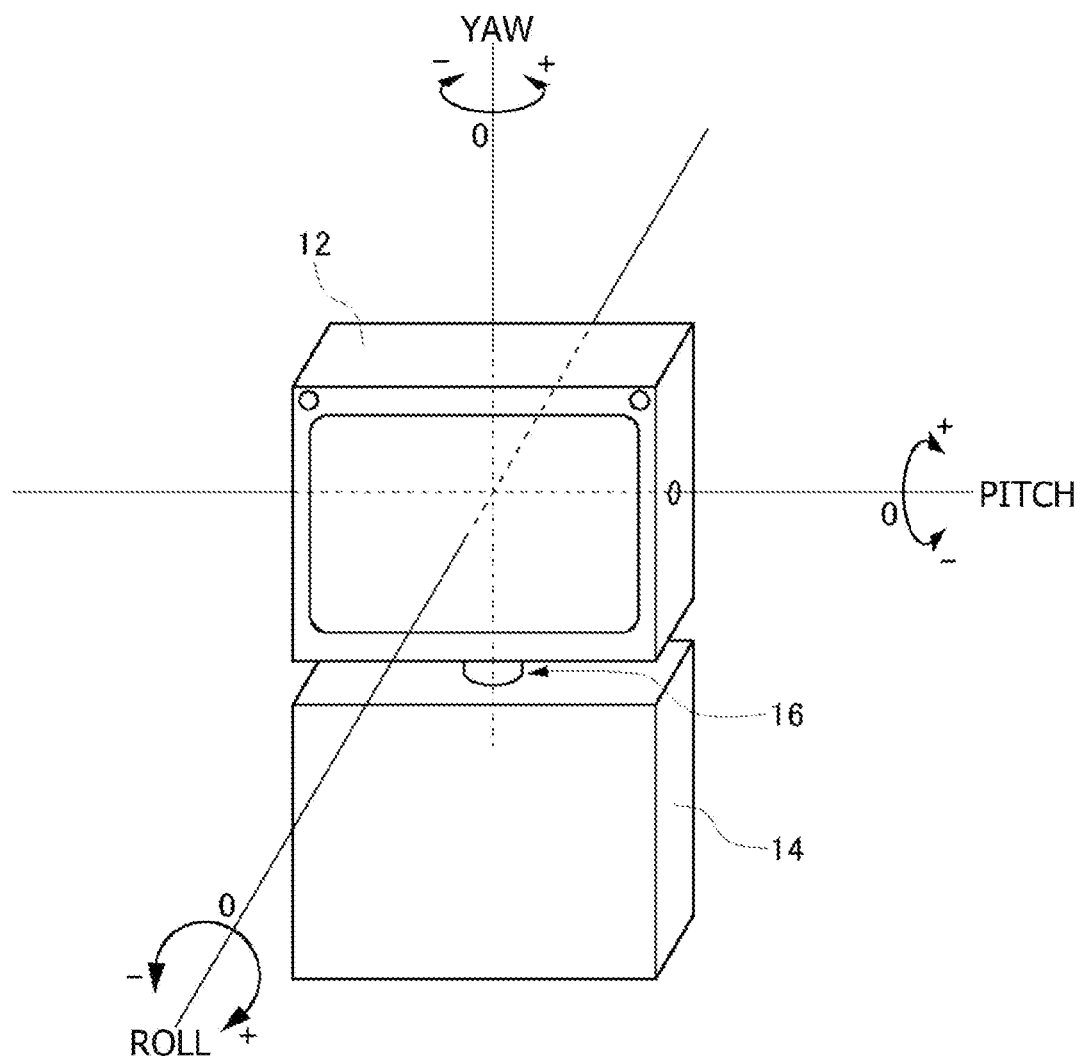
FIG. 6 is a diagram illustrating a direction in which the first rotating device rotates the head.

FIG. 6 is a diagram illustrating the direction in which the first rotating device 16 rotates the head 12. The control signal specifies the roll direction rotation angle, the pitch direction rotation angle, and the yaw direction rotation angle, and the control section 30 drives the first rotating device 16 according to the control signal. According to the above-mentioned control signal, the control section 30 drives the first rotating device 16 in such a manner as to provide a roll direction rotation angle of −10 degrees, a pitch direction rotation angle of 15 degrees, and a yaw direction rotation angle of 40 degrees.

The camera 22 captures an image at predetermined intervals (e.g., at 1/60-second intervals), and supplies captured image data to the control section 30. The microphone 26 generates a sound signal by converting the sounds around the robot 10 to an electrical signal, and allows the control section 30 to generate sound data by encoding the sound signal. The transmission section 34 receives the image data and the sound data from the control section 30, and transmits the received image data and sound data to the information processing device 200. The information processing device 200 transmits the received image data and sound data to the mobile terminal device 100.

In the mobile terminal device 100, the reception section 124 receives the image data captured by the robot 10 and the sound data acquired by the robot 10 from the information processing device 200, and supplies the received image data and sound data to the control section 102. The control section 102 causes the display section 114 to display the image data captured by the robot 10, and causes the speaker 116 to output the sound data acquired by the robot 10. This enables the user A to view the situation of the members in the conference room and listen to what the members have to say.

The yaw direction rotary motion of the robot 10 will now be described. For convenience of explanation, the following description of an example motion assumes that the roll angle and pitch angle of the face are zero degrees.

In a case where a roll angle of zero degrees, a pitch angle of zero degrees, and a yaw angle of 45 degrees are detected as the orientation of the face by the motion detection section 230, the control signal generation section 232 determines that the first rotating device 16 provides the following rotation angles.

<Rotation Angles Provided by First Rotating Device 16>
  Roll direction rotation angle: zero degrees
  Pitch direction rotation angle: zero degrees
  Yaw direction rotation angle: 45 degrees The control signal generation section 232 generates a control signal for causing the first rotating device 16 to provide a roll direction rotation angle of zero degrees, a pitch direction rotation angle of zero degrees, and a yaw direction rotation angle of 45 degrees, and allows the transmission section 212 to transmit the generated control signal to the robot 10.

Figure 7A:
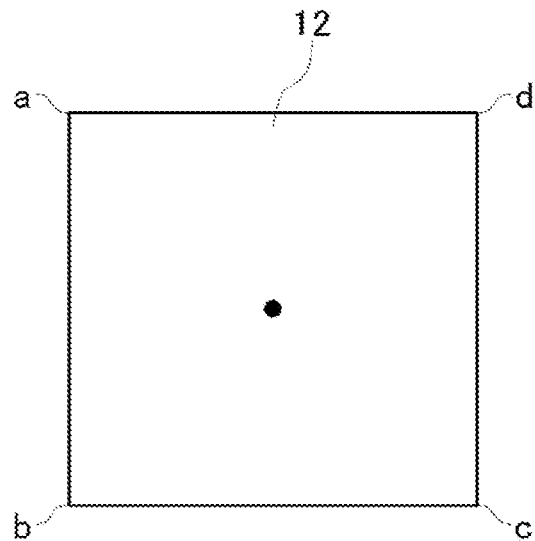
FIGS. 7A and 7B illustrate diagrams of example states of the robot as viewed from the top.
Figure 7B:
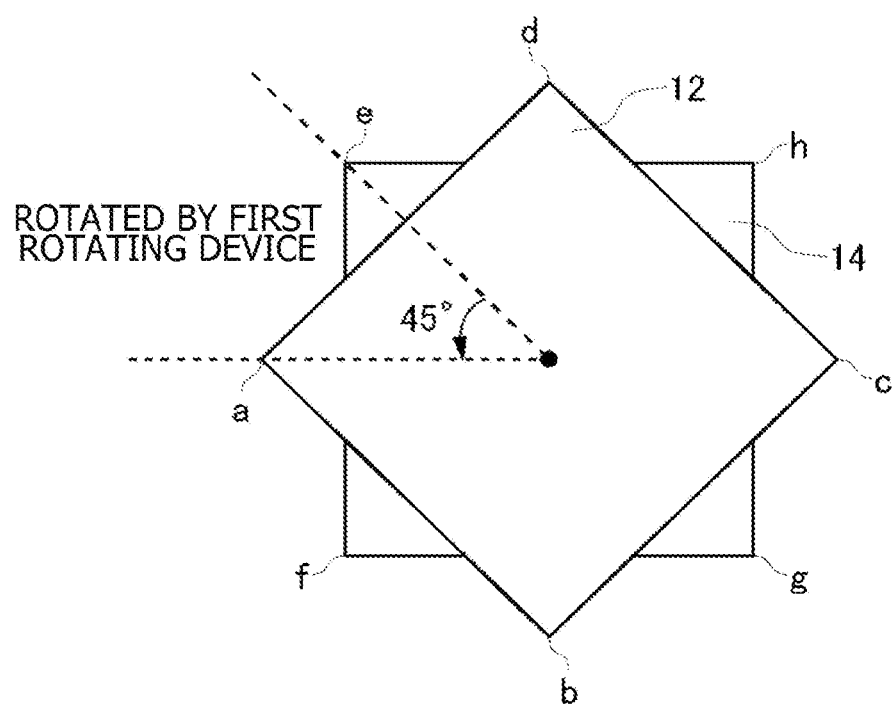

FIGS. 7A and 7B illustrate example states of the robot 10 as viewed from the top. FIG. 7A depicts a state where a yaw direction rotation angle of zero degrees is provided by the first rotating device 16. When viewed from the top, the head 12 and the torso 14 completely overlap with each other. Points a, b, c, and d respectively indicate the top vertices of the head 12.

FIG. 7B depicts a state where the first rotating device 16 is driven by the control section 30 according to a control signal for providing a roll direction rotation angle of zero degrees, a pitch direction rotation angle of zero degrees, and a yaw direction rotation angle of 45 degrees. The first rotating device 16 is driven in such a manner that the head 12 is rotated 45 degrees in the positive yaw direction with respect to the torso 14. Points e, f, g, and h respectively indicate the top vertices of the torso 14.

Subsequently, when the motion detection section 230 detects a roll angle of zero degrees, a pitch angle of zero degrees, and a yaw angle of 50 degrees as the orientation of the face, the control signal generation section 232 determines that the first rotating device 16 provides the following rotation angles.

<Rotation Angles Provided by First Rotating Device 16>
  Roll direction rotation angle: zero degrees
  Pitch direction rotation angle: zero degrees
  Yaw direction rotation angle: 45 degrees Although the detected yaw angle of the face is 50 degrees, the yaw direction maximum rotation angle 7 is 45 degrees. Therefore, the control signal generation section 232 determines that the yaw direction rotation angle is 45 degrees.

In the above instance, the control signal generation section 232 determines that the second rotating device 18 provides the following rotation angle.

<Rotation Angle Provided by Second Rotating Device 18>
  Yaw direction rotation angle: 5 degrees As described above, in a case where the yaw angle of the face is greater than 45 degrees, the control signal generation section 232 provides a total yaw angle rotation angle of 50 degrees by determining that the first rotating device 16 provides a yaw direction rotation angle of 45 degrees, which is the maximum rotation angle, and that the second rotating device 18 provides a yaw direction rotation angle of 5 degrees. The control signal generation section 232 generates a control signal for causing the first rotating device 16 to provide a roll direction rotation angle of zero degrees, a pitch direction rotation angle of zero degrees, and a yaw direction rotation angle of 45 degrees and causing the second rotating device 18 to provide a yaw direction rotation angle of 5 degrees, and allows the transmission section 212 to transmit the generated control signal to the robot 10.

Figure 8A:
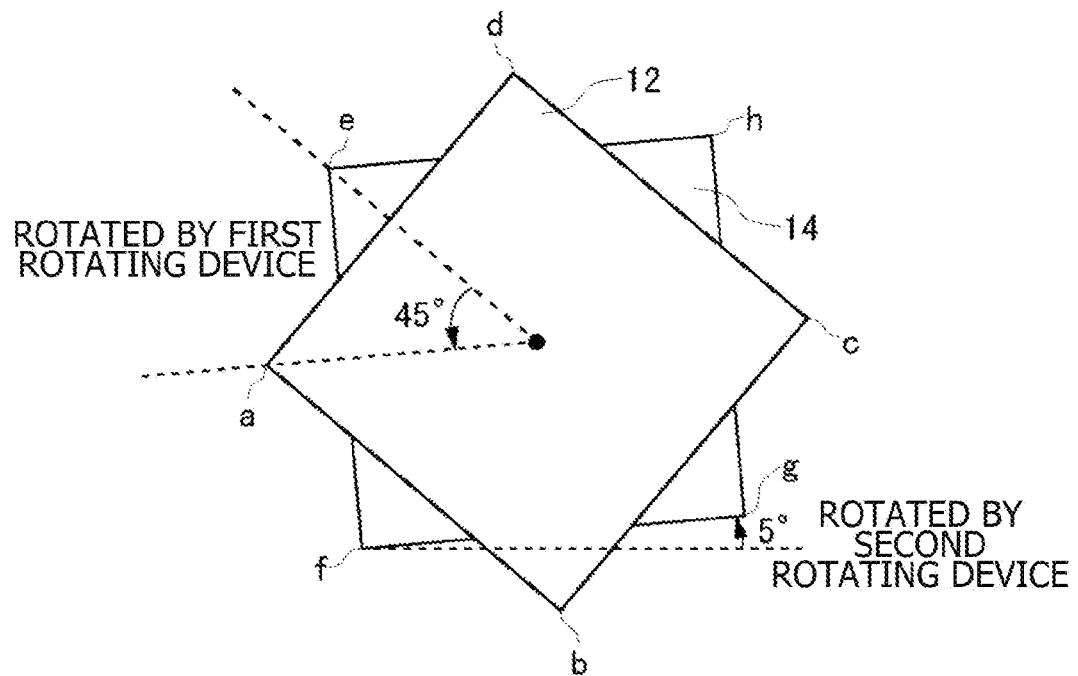
FIGS. 8A and 8B illustrate diagrams of example states of the robot as viewed from the top.

FIG. 8A illustrates an example state of the robot 10 as viewed from the top. According to a control signal for causing the first rotating device 16 to provide a yaw direction rotation angle of 45 degrees and causing the second rotating device 18 to provide a yaw direction rotation angle of 5 degrees, the control section 30 rotates the second rotating device 18 while continuously driving the first rotating device 16. More specifically, from the state depicted in FIG. 7B, the second rotating device 18 causes the torso 14 to rotate 5 degrees in the positive yaw direction with respect to the contact surface of the robot 10. The first rotating device 16 remains in the state where the head 12 is rotated 45 degrees in the positive yaw direction with respect to the torso 14.

Let us now assume that the user A subsequently rotates the head in the positive yaw direction and that a roll angle of zero degrees, a pitch angle of zero degrees, and a yaw angle of 90 degrees are detected by the motion detection section 230. The control signal generation section 232 then determines that the first rotating device 16 provides the following rotation angles.

<Rotation Angles Provided by First Rotating Device 16>
 Roll direction rotation angle: zero degrees
 Pitch direction rotation angle: zero degrees
 Yaw direction rotation angle: 45 degrees In the above instance, the control signal generation section 232 determines that the second rotating device 18 provides the following rotation angle.

<Rotation Angle Provided by Second Rotating Device 18>
 Yaw direction rotation angle: 45 degrees The control signal generation section 232 provides a total yaw angle rotation angle of 90 degrees by determining that the first rotating device 16 provides a yaw direction rotation angle of 45 degrees, which is the maximum rotation angle, and that the second rotating device 18 provides a yaw direction rotation angle of 45 degrees. The control signal generation section 232 generates a control signal for causing the first rotating device 16 to provide a roll direction rotation angle of zero degrees, a pitch direction rotation angle of zero degrees, and a yaw direction rotation angle of 45 degrees and causing the second rotating device 18 to provide a yaw direction rotation angle of 45 degrees, and allows the transmission section 212 to transmit the generated control signal to the robot 10.

Figure 8B:
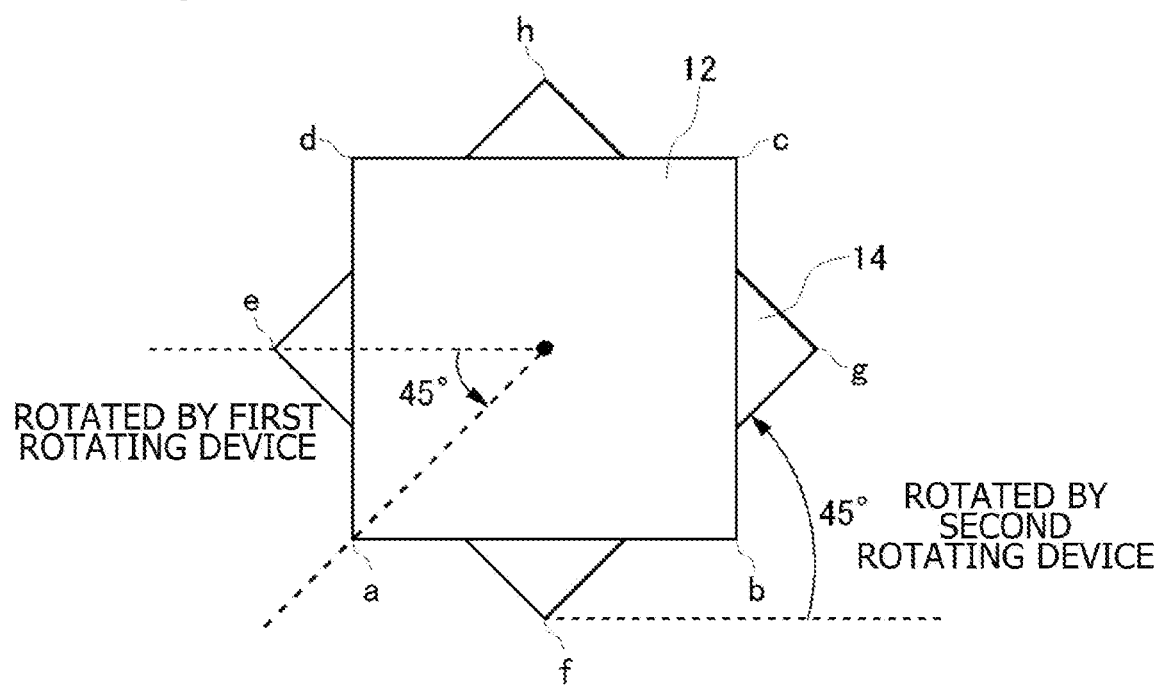

FIG. 8B illustrates an example state of the robot 10 as viewed from the top. According to a control signal for causing the first rotating device 16 to provide a yaw direction rotation angle of 45 degrees and causing the second rotating device 18 to provide a yaw direction rotation angle of 45 degrees, the control section 30 further rotates the second rotating device 18 while continuously driving the first rotating device 16. The second rotating device 18 causes the torso 14 to rotate 45 degrees in the positive yaw direction with respect to the contact surface of the robot 10. The first rotating device 16 remains in the state where the head 12 is rotated 45 degrees in the positive yaw direction with respect to the torso 14.

In the robot 10, as described above, the control section 30 causes the first rotating device 16 to rotate the head 12, and then causes the second rotating device 18 to rotate the torso 14. In the embodiment, the control section 30 causes the first rotating device 16 to rotate the head 12 by the maximum rotation angle, and then causes the second rotating device 18 to rotate the torso 14. When the above-described motion control is exercised, the robot 10 twists the head 12 laterally by 45 degrees with respect to the torso 14, and then laterally rotates the whole body while the head 12 is twisted. This creates a motion similar to a motion that is performed by humans turning sideways.

In a case where the yaw direction rotation angle is greater than 45 degrees, the control signal generation section 232 generates a control signal for causing the first rotating device 16 to continuously provide a rotation angle of 45 degrees and causing the second rotating device 18 to provide a rotation angle equal to the yaw direction rotation angle −45 degrees. Meanwhile, in a case where the yaw direction rotation angle of the head 12 is 45 degrees or smaller, the control signal generation section 232 generates a control signal for causing the second rotating device 18 to provide a rotation angle of zero degrees and causing the first rotating device 16 to provide the yaw direction rotation angle. A motion similar to a motion performed by humans turning sideways can be created by controlling the motion of the first rotating device 16 and second rotating device 18 in the above-described manner.

Note that, in the above-described example, the control signal generation section 232 determines the roll direction rotation angle, the pitch direction rotation angle, and the yaw direction rotation angle of the head 12 of the robot 10 in such a manner as to provide the rotation angles equal, respectively, to the roll angle, the pitch angle, and the yaw angle of the face that are detected by the motion detection section 230. In an alternative example, the control signal generation section 232 may determine the roll direction rotation angle, the pitch direction rotation angle, and the yaw direction rotation angle of the head 12 of the robot 10 in such a manner as to provide the rotation angles equal, respectively, to R times the roll angle, the pitch angle, and the yaw angle of the face that are detected by the motion detection section 230. In this instance, R may be a constant smaller than 1.

The motion detection section 230 in the embodiment may detect the roll angle, the pitch angle, and the yaw angle of the face of the user A by considering the sensor data measured by the IMU 118 in addition to the orientation of the face of the user A that is detected from a captured image. Specifically, the motion detection section 230 detects the orientation of the face of the user A by identifying the orientation of the mobile terminal device 100 with respect to a standard posture of the mobile terminal device 100. The standard posture of the mobile terminal device 100 may be set by registering a posture in which, before the start of real-time communication, the user A holds the mobile terminal device 100 in hand with the head of the user A oriented in the vertical direction and positions the mobile terminal device 100 to face the face of the user A.

The motion detection section 230 detects the orientation of the mobile terminal device 100 with respect to the standard posture by using the sensor data acquired by the sensor data acquisition section 224. Specifically, the motion detection section 230 detects the orientation of the mobile terminal device 100 by determining the roll angle, the pitch angle, and the yaw angle with respect to the standard posture. In the embodiment, the user A participates in the conference while holding the mobile terminal device 100 in such a manner that the mobile terminal device 100 faces the face of the user A (see FIG. 1). Therefore, the relative positional relation between the face of the user A and the mobile terminal device 100 does not basically change. Consequently, in the embodiment, changes in the orientation of the mobile terminal device 100 are handled as the changes in the orientation of the face of the user A that faces the mobile terminal device 100.

Based on the image data, the motion detection section 230 detects the orientation of the face of the user in a manner described below.

Roll angle: Ra
Pitch angle: Pa
Yaw angle: Ya

Based on the sensor data, the motion detection section 230 detects the orientation of the mobile terminal device 100 (i.e., the orientation of the face of the user) in a manner described below.

Roll angle: Rb
Pitch angle: Pb
Yaw angle: Yb

The control signal generation section 232 may determine the roll direction rotation angle, the pitch direction rotation angle, and the yaw direction rotation angle of the head 12 in a manner described below.

$$\text{Roll direction rotation angle} = s1 \times Ra + s2 \times Rb$$

where s1 and s2 are coefficients equal to or smaller than 1. In a case where an unnatural motion is generated when roll direction rotational components of the sensor data are reflected in the motion of the head 12, s2 may be set to 0 or a value close to 0. Further, s1 may be set to 0.75 for the reasons described below.

$$\text{Pitch direction rotation angle} = t1 \times Pa + t2 \times Pb$$

where t1 and t2 are coefficients equal to or smaller than 1. In general, the detection of the orientation of the mobile terminal device 100 based on the sensor data is higher in accuracy than the detection of orientation of the face based on the image data. Therefore, the relation based on the relational expression t1<t2 may be set. For example, t1 and t2 may be set in such a manner that t1=0.75 and that t2=1.0.

$$\text{Yaw direction rotation angle} = u1 \times Ya + u2 \times Yb$$

where u1 and u2 are coefficients equal to or smaller than 1. For the reasons above, the relation based on the relational expression u1<u2 may be set. For example, u1 and u2 may be set in such a manner that u1=0.75 and that u2=1.0.

Since the control signal generation section 232 determines the orientation of the head 12 by considering not only the orientation of the face, which is detected from the face image of the user A, but also the orientation of the mobile terminal device 100, which is detected from the sensor data, it is possible to generate a control signal that reflects the motion of the head of the user A with high accuracy.

The motion detection section 230 may detect the orientation of the mobile terminal device 100 by ignoring slight inconsistency in the sensor data. During the conference, the user A constantly holds the mobile terminal device 100. Therefore, arm swinging due to fatigue may propagate to the mobile terminal device 100. In view of such a situation, the motion detection section 230 may set a predetermined threshold for processing the sensor data, and ignore vibrational components of the sensor data that are smaller than the predetermined threshold.

The present disclosure has been described in terms of the embodiment. It is to be understood by persons skilled in the art that the embodiment is illustrative, and that a combination of the component elements and processes described in conjunction with the embodiment can be variously modified, and further that such modifications can be made without departing from the spirit and scope of the present disclosure.

In the embodiment, the mobile terminal device 100 transmits the sound data to the robot 10 through the information processing device 200. In a modified embodiment, however, the mobile terminal device 100 may directly transmit the sound data to the robot 10 without passing the sound data through the information processing device 200. Further, in the embodiment, the robot 10 transmits the image data and the sound data to the mobile terminal device 100 through the information processing device 200. However, in a modified embodiment, the robot 10 may transmit the image data and the sound data to the mobile terminal device 100 without passing the image data and the sound data through the information processing device 200.

The embodiment has been described on the assumption that the control section 30 of the robot 10 causes the display section 20 to display a still image of the face of the user A. Alternatively, however, the image data captured by the mobile terminal device 100 may be supplied to the robot 10 to let the control section 30 display a moving image of the face of the user A on the display section 20.

The embodiment has been described on the assumption that, in the yaw direction, the first rotating device 16 rotates the head 12 by the maximum rotation angle, and that the second rotating device 18 subsequently rotates the torso 14 with respect to the contact surface. However, when a state where the head 12 is rotated by the maximum rotation angle continues for a predetermined period of time, the control section 30 may rotate the first rotating device 16 in the direction of reverting to an unrotated state (in the backward direction) and simultaneously rotating the second rotating device 18 in the forward direction at the same rotation speed as the first rotating device 16 for the purpose of resolving a situation where the head 12 and the torso 14 are in a twisted state.

What is claimed is:

1. An information processing device comprising:
    one or more storage devices storing instructions;
    one or more processors, that upon execution of the instructions, configured to:
        control a motion of a robot having a torso and a head, the robot comprising:
            a first rotating device configured to rotate the head with respect to the torso; and
            a second rotating configured to rotate the torso with respect to a contact surface of the robot;
        obtain an image of a face from of a mobile terminal device;
        detect an orientation of the face from the image;
        according to the detected orientation of the face, generate a first control signal causing the first rotating device to rotate the head with respect to the torso, and generate a second control signal causing the second rotating device to rotate the torso; and
    a transmitter configured to transmit the generated control signals to the robot.

2. The information processing device according to claim 1, further comprising a receiver configured to receive inertial sensor data from the mobile terminal device, and
    wherein the one or more processors are configured to generate at least one of the first control signal or the second control signal according to the inertial sensor data.

3. The information processing device of claim 2, wherein the one or more processors are configured to detect the orientation of the face further based on the inertial sensor data.

4. The information processing device of claim 3, wherein the one or more processors are configured to detect the orientation of the face based on a current orientation of the mobile terminal device with respect to a reference orientation of the mobile terminal device based on the inertial sensor data.

5. The information processing device according to claim 1, wherein the one or more processors are configured to provide the first control signal and then further configured to provide the second control signal,
wherein the first control signal causes the first rotating device to rotate the head in a predetermined rotation direction, and
wherein the second control signal causes the second rotating device to rotate the torso in the predetermined rotation direction.

6. The information processing device according to claim 5, wherein the first control signal causes the first rotating device to rotate the head by a maximum rotation angle.

7. The information processing device of claim 5, wherein
upon detecting that the face in the image is rotated in the predetermined rotation direction by an actual rotation angle that is greater than the maximum rotation angle, the one or more processors are configured to generate the first control signal causing the first rotating device to rotate the head by the maximum rotation angle in the predetermined rotation direction, and then further configured to generate the second control signal for causing the second rotating device to rotate the torso in the predetermined rotation direction by an angle equal to a difference between the actual rotation angle and the maximum rotation angle.

8. The information processing device of claim 1, wherein each of a housing of the head and a housing of the torso is cuboid.

9. A robot comprising:
a torso;
a head;
a first rotating device configured to rotate the head with respect to the torso in a predetermined rotation direction;
a second rotation device configured to rotate the torso with respect to a contact surface of the robot; and
a controller configured to cause the first rotating device to rotate the head with respect to the torso, and then cause the second rotating device to rotate the torso with respect to the contact surface of the robot.

10. The robot according to claim 9, wherein the controller causes the first rotating device to rotate the head by a maximum rotation angle, and then causes the second rotating device to rotate the torso.

11. The robot according to claim 9, wherein the predetermined rotation direction is a yaw direction.

12. The robot according to claim 9, wherein the head includes a display configured to display an image of a face or an image related to the face.

13. The robot of claim 12, wherein the head further comprises:
a camera configured to capture an image of a space facing the display;
a microphone configured to collect sounds around the robot;
a receiver configured to receive one or more user images comprising at least one of the image of the face from a mobile terminal device or the image related to the face; and
a transmitter configured to transmit the image of the space and the sounds to the mobile terminal device concurrently with receiving the one or more user images,
wherein the controller is configured to cause the first rotating device to rotate the head or cause the second rotating device to rotate the torso based on the received one or more user images.

14. The robot of claim 12, wherein the maximum rotation angle is based on an angular limit of a human head rotation with respect to a human torso.

15. The robot of claim 9, wherein each of a housing of the head and a housing of the torso is a cuboid.

16. The robot of claim 9, wherein the first rotating device is configured to rotate by the maximum rotation angle in the predetermined rotation direction, and wherein the second rotating device is configured to rotate the torso in the predetermined rotation direction by an angle equal to a difference between the actual rotation angle and the maximum rotation angle, after the head is rotated with respect to the torso by the maximum rotation angle in the predetermined rotation direction.

17. A system comprising:
a robot comprising:
a torso;
a head disposed above the torso;
a first rotating device configured to rotate the head with respect to the torso;
a second rotation device configured to rotate the torso with respect to a contact surface of the robot; and
a controller configured to cause the first rotating device to rotate the head with respect to the torso, and further configured to cause the second rotating device to rotate the torso with respect to the contact surface of the robot;
one or more storage devices storing instructions; and
one or more processors, that upon execution of the instructions, configured to:
obtain an image of a face;
detect an orientation of the face based on the image;
according to the detected orientation of the face, generate a first control signal causing the first rotating device to rotate the head with respect to the torso, and generate a second control signal causing the second rotating device to rotate the torso; and
provide the generated first and second control signals to the controller,
wherein the controller is configured to cause the first rotating device to rotate the head with respect to the torso responsive to the first control signal, and further configured to cause the second rotating device to rotate the torso with respect to the contact surface of the robot responsive to the second control signal.

18. The system of claim 17, wherein the first rotation device is configured to rotate the head with respect to the torso in a predetermined direction within a maximum rotation angle, and
wherein, upon detecting that the face in the image is rotated in the predetermined rotation direction by an actual rotation angle that is greater than the maximum rotation angle, the one or more processors are configured to generate the first control signal causing the first rotating device to rotate the head by the maximum rotation angle in the predetermined rotation direction, and then further configured to generate the second control signal for causing the second rotating device to rotate the torso in the predetermined rotation direction following the first control signal.

19. The system of claim 18, wherein the second control signal causes the second rotating device to rotate the torso by an angle that is a difference between the actual rotation angle and the maximum rotation angle.

20. The system of claim 18, wherein the robot is an avatar related to the face,
   wherein the maximum rotation angle is based on an angular limit of a human head rotation with respect to a human torso.

* * * * *